Patented July 27, 1954

2,684,961

UNITED STATES PATENT OFFICE 2,684,961

CHLORINATION OF SUGARS

Harold N. Barham, Manhattan, Kans., assignor to Sharples Chemicals Inc., a corporation of Delaware No Drawing. Application April 14, 1949, Serial No. 87,563

16 Claims. (Cl. 260—209)

This invention pertains generally to the chlorination of sugars. It pertains more particularly to a process for the chlorination of sugars, and to new chlorinated sugar products, that is, chlorinated sugar products in which the chlorine is chemically bound to the sugar. The chlorinated product may consist of monomers having the same number of carbon atoms as original sugar or it may be chlorinated polymer of the original sugar.

Processes have been described in the prior art in which the sugars are treated with gaseous chlorine whereas in my process I use chlorine in the liquid phase in a hitherto unknown reaction with sugars.

The advantages of my invention over the prior art lie both in the extent and in the nature of the reaction. A degree of chlorination beyond that obtainable in gaseous chlorination is easily attained. Moreover, condensation reactions accompany the chlorination yielding in the same operation polymeric chlorine-containing substances.

My process may be carried out either under anhydrous conditions, or in the presence of water. The reaction under anhydrous conditions (i. e. in the presence of not more than 1% or 2% of water based on the sugar) occurs in essentially a non-polar medium (liquid chlorine) in contrast to occurring in a polar medium when water is present in substantial amount. The mechanism of the reaction differs in these different media, the action of the chlorine being different as evidenced by the results. By the addition of controlled amounts of water (which is neither miscible with nor consumed by liquid chlorine) to the system the nature of the reaction can be varied from one extreme to the other. In other words by adding controlled amounts of water the nature of the reaction can be varied from a non-polar type of reaction yielding polymeric and monomeric chlorinated solids to an ionic type of reaction forming low molecular weight, highly oxidized and low-chlorine containing substances.

While chlorination in the presence or absence of water employing gaseous chlorine as the chlorination agent has been described in the prior art, the nature of the reactions involved and the extent to which they may be carried out are quite different than in the case of my use of chlorine in the liquid phase, the advantages of the use of liquid chlorine being heretofore unknown and unpredictable.

In my process liquid chlorine is present as a distinct liquid phase separate from the aqueous phase when water is present. In other words, my reaction is not one in which chlorine is present only in the form of a solution in water.

Both oxidation and substitution reactions are involved in the production of a series of products of varying chlorine percentages, a by-product of the reaction being hydrogen chloride.

In the practice of my invention, chlorine in liquid phase is employed as the reagent, and the sugar treated to produce the desired products is immersed in the liquid chlorine. Thus in the practice of the invention it is preferred that the sugar be completely covered with liquid chlorine, since any sugar extending above the liquid will be subjected to a vapor phase treatment resulting in products different in character.

Any means known in the art may be employed for maintaining the chlorine in liquid phase, such as self-induced pressure in closed container, for example, an autoclave. Thus as long as the chlorine employed for chlorination purposes is maintained in the liquid phase, the super-atmospheric pressure in the zone of reaction may be at any desired level.

In the practice of my invention, sugar is immersed in liquid chlorine, such as in an autoclave. The actual size of the sugar sample is, of course, determined by the size and shape of the autoclave as is the amount of liquid chlorine required to immerse, or in other words, completely cover the sugar, as is preferred for the reasons above set forth.

While it is usually preferred to treat sugar in a relatively pure state, it is to be understood that impure sugar, that is, in a partially purified state, may likewise be treated in the production of chlorinated sugar products more or less contaminated with impurities due to the impurities present in the sugar subjected to treatment.

While any suitable temperature may be maintained in the reaction zone, I usually prefer to employ temperatures between 40° C. and 140° C., and more particularly, between 60° C. and 100° C., in order that the reaction may proceed at a reasonable rate by having the temperature sufficiently high, and in order to avoid the production of excessive quantities of undesirable by-products by maintaining the temperature below the point at which excessive amounts of undesirable by-products are produced, such as by destructive decomposition.

The time of the reaction will obviously vary with the temperature, the reactivity of the sugar under treatment, and the degree of chlorination desired. As an example, the treatment of powdered anhydrous glucose for eight hours in an autoclave at a temperature of 70° C. in the reaction zone resulted in a yellow-brown solid chlorinated product containing 31.02% by weight of chemically bound chlorine.

While the process may be carried out by operating batchwise, it lends itself to other types of treatment, such as, batch counter-current, or a treating procedure wherein liquid chlorine is made to flow through a body of sugar under treatment with recycling of the liquid chlorine, if desired, such as after the removal of HCl therefrom.

Since chlorine under the temperature of treatment has a substantial vapor pressure, chlorine is present in the vessel in both the liquid and vapor phases unless, of course, the vessel is completely filled with liquid.

Examples of sugars which may be treated in accordance with my invention are glucose, fructose, galactose, mannose, arabinose, xylose, sucrose, maltose, lactose, etc. in any of the isomeric forms thereof or in mixtures, with or without pretreatment for purposes of purification, change of physical form, or otherwise.

It is to be understood that the particular sugars enumerated above are by way of illustration, the process of the invention being applicable to all sugars. Thus is contemplated the chlorination of sugars known as monosaccharides, including the various hexoses and pentoses whether aldehydic or ketonic in structure, i. e. the aldoses and the ketoses. The various disaccharides, such as may be considered to be derived by co-condensation of two molecules of the same or of different monosaccharides also come within the scope of my invention.

In the case of impure sugar, the impurities may be separated prior to treatment to any desired extent, or the chlorinated sugar products may be purified to any desired extent after their production in accordance with my invention. In certain instances, valuable by-products may be produced.

My new products have a variety of uses, for example, as chemical intermediates, since the carbonyl groups as well as the chlorine atoms serve as reactive centers. They may also be employed as constituents in the production of plastics and resins.

The products of anhydrous chlorination can be rendered more reactive by mild pyrolysis to drive off a part of the chemically bound chlorine. This may be accomplished, for example, by heating the chlorinated product at 70° C. under vacuum, such as at a pressure of 20 mm. of Hg. As an example, a product containing approximately 33% chlorine by weight may be reduced in chlorine content to 25% by weight as the result of such treatment.

Products of the chlorination of aqueous solutions, for example, of glucose, are in a higher state of oxidation, and may be comprised in part of organic acids containing two or more carbon atoms such as up to six in the case of glucose. Oxalic acid is an example of an acid produced when an unsaturated aqueous solution of glucose is employed. With lesser amounts of water larger amounts of products which are both oxidized and chlorinated are obtained.

In the practice of my process, any desired degree of chlorination of the sugar may be effected. For instance, sugar may be converted into chlorinated products varying in chlorine content from one chlorine atom per sugar molecule to several chlorine atoms per sugar molecule.

If the monochloride is the ultimately desired product, a reaction product comprising the monochloride in substantial part may be obtained by the simple expedient of cooling the reaction mixture to room temperature or below when a substantial quantity of monochloride has been formed, and thereafter removing chlorine and hydrogen chloride from the reaction vessel.

If a product of a more advanced stage of chlorination than the monochloride is desired, it is merely necessary to continue the reaction to effect the desired further chlorination.

Thus the operator can obtain a product comprising, for the most part, sugar monochloride, or of the respective higher chlorides, by conducting the chlorination until the desired amount of chlorine has been combined with the sugar molecule and by terminating the reaction at this point. He may also obtain products of intermediate degrees of chlorination, short of the monochloride, or between the respective chlorides, by similar control of the percentage content of the chlorine in the product.

My sugar chlorides are believed to be predominantly alpha-chloroketones or aldehydes. In the foregoing discussion such products have been designated as sugar monochlorides, dichlorides, etc. indicating that the number of chlorine atoms attached to the sugar ring is 1, 2, etc., respectively. For convenience this terminology will be considered to apply not only to sugar chlorides which exist in monomeric form but also to those which are polymeric. Thus, in the case of a polymeric sugar chloride, the prefix mono-, di-, etc. refers to the average number of combined chlorine atoms per sugar ring in the polymer. Moreover, the average number of chlorine atoms introduced per sugar ring in the polymer is not confined to integral values but may be varied continuously between about one and the maximum value attainable, usually about six, i. e. from the monochloride to the hexachloride. This is an indication of the fact that the sugar rings of a polymer chloride need not all contain the same number of chlorine atoms. In general, however, degrees of chlorination higher than that corresponding to the tetrachloride are more difficult to attain, and my process is particularly suited to the preparation of sugar chlorides containing from about one to about four chlorine atoms per sugar ring.

The percentage chlorine content corresponding to the various molecular degrees of chlorination will not, of course, be the same for all sugar chlorides but will depend upon the molecular weight of the sugar employed and upon other factors. In the case of glucose, a monomeric monochloride containing four carbonyl groups and one carbinol group will contain 17.17% chlorine by weight; a glucose dichloride containing five carbonyl groups will have a chlorine content of 29.67% by weight; a glucose tetrachloride containing four carbonyl groups will contain 48.26% chlorine by weight. Polymeric glucose chlorides have been prepared containing almost 60% of chemically combined chlorine.

The initial reaction of the liquid chlorine on the sugar molecules causes formation of products which may be designated as hypochlorites and chlorocarbinols, respectively. Likewise, the hypochlorites and chlorocarbinols of already formed sugar chlorides are formed as intermediates in the formation of higher chlorination products. These intermediate products can be obtained at any desired stage of the chlorination by the same procedure as discussed above, namely, by simple cooling of the reaction mixture and then removing unused chlorine and hydrogen chloride. In this connection, however, it should be noted that the products of intermediate degrees of chlorination are less stable than the forms designated, for example, as monochloride, dichloride, trichloride, tetrachloride and hexachloride, and that these intermediate forms may lose chlorine in the form of HCl and $Cl_2$, to a certain extent at least, when the reaction is interrupted, or subsequently, and depending to a certain extent upon the subsequent handling thereof.

In order to guard against destructive decomposition of the sugar during chlorination, I prefer to conduct the reaction during the stage prior to the attainment of the condition in which an average of one chlorine atom per sugar ring becomes chemically bound, which in the case of glucose is prior to the time when about 17% by weight of chemically combined chlorine is present, so that the molecular ratio of chlorine to hydrogen chloride in the zone of reaction, that is in the liquid chlorine phase surrounding the sugar, exceeds approximately 6 to 1. Any desired means may be employed for insuring this excess of chlorine over hydrogen chloride present, such as, use of an originally sufficient excess of chlorine, the addition of further chlorine, the removal of hydrogen chloride, or any combination thereof, or otherwise. Subsequent to this monochloride stage, the ratio of chlorine to HCl is less critical.

While I prefer to employ substantially undiluted liquid chlorine in my process (except for such HCl and water, if present, as dissolves therein in the practice of the process), it is to be understood that a solvent for the chlorine or a nonsolvent diluent may be present, particularly if such solvent or diluent is inert in the sphere of the reaction. Thus chlorine in solution might be employed, such as for example, a solution of chlorine in a non-polar solvent such as carbon tetrachloride or in any other suitable solvent which is inert under the conditions obtaining in the chlorination reaction. The concentration of chlorine in any such solution preferably should be at least 50%, and more preferably at least 75%, such as, at least 90%.

For effective chlorination of the sugar charged to the process, the state of sub-division of the sugar should preferably be such as to permit the chlorine to intimately contact the same for reaction purposes as will be understood.

After the sugar and liquid chlorine are charged to the process, which, for convenience, is usually at temperatures at or below room temperatures, it is preferred that the charge be brought up to temperature for chlorination purposes slowly in order to control the rate of reaction and the rate of heat evolution.

As has been pointed out my chlorination provides sugar chlorides which may be monomeric or polymeric. Control of the reaction to give a product which is entirely the monomer, or entirely polymer, is extremely difficult, and, as a general rule, the sugar chlorides formed will comprise a mixture of monomers and polymers. In most instances the polymer content of the product will be relatively large when the reaction is conducted for a relatively long period of time at a relatively low temperature. Conversely the monomer content will be larger when the reaction is conducted at somewhat higher temperatures for a shorter reaction period. For many purposes the mixed reaction product may be employed without separation into molecular types. When separation of the monomeric product from the polymeric product is desired, however, this may readily be effected by conventional methods such as by selective solvent action.

When my reaction is conducted in the presence of water, products are obtained which tend to be a lower chlorine content but of a higher degree of oxidation than when water is excluded. Thus when the weight of water present is in excess of the weight of the sugar, such as up to ten times the weight of the sugar, products of low chlorine content but in a highly oxidized condition may be obtained together with some products containing no chlorine whatsoever.

When the specific gravity of the aqueous sugar solution undergoing chlorination is less than the specific gravity of the liquid chlorine phase, effective stirring or agitation is necessary to maintain substantially complete dispersion of one liquid phase in the other. In the absence of effective agitation the upper aqueous layer would be subjected to contact with the vapor chlorine phase (which may be present in the reaction vessel) to an undesirable extent.

While the exact chemical structure of all of the products produced has not as yet been definitely established, it has been determined that they contain carbonyl groups (resulting from dehydrogenation of hydroxyl groups), chlorocarbinol configurations and, to a minor extent, hypochlorite groups. Since these molecules, either in monomeric or polymeric form, contain two or more reactive points they are potentially suitable for the preparation of resins and various useful polymeric substances. In fact, as has been mentioned, they tend to polymerize or condense with themselves during the process of chlorination to form products of higher molecular weight. This condensation is believed to occur by reaction of a chlorocarbinol group of one molecule with a hydroxyl group of another molecule with accompanying elimination of a molecule of HCl. The ring structure of the original sugar is believed to be retained in the polymer, which thus consists of a chain of substituted sugar rings linked by oxygen atoms. Polymers containing from two to ten monomer units or more may be obtained.

As a general indication of the reaction conditions incident to the production of products of a moderate degree of chlorination, for example, a product containing two atoms of chlorine per molecule of sugar undergoing reaction, temperatures of about 50° C. were accompanied by a time of approximately 48 hours, temperatures of about 70° C. were accompanied by a time of approximately 12 hours, and temperatures of about 90° C. were accompanied by a time of approximately 4 hours. It will be understood that the reaction period required will not only vary with the temperature employed, but will also vary with (1) the degree of chlorination desired, (2) the particular sugar being used in the reaction, and (3) the reaction environment, including the amount of water present in the reaction mixture. These factors may be varied within the choice and skill of the operators to obtain the various products for the production of which my process is outstandingly adapted.

My invention will be further illustrated by the following examples.

Example 1

0.75 gram of dry, powdered glucose was introduced in to a Pyrex reaction tube which was then cooled to a temperature of −76° C. by immersion in a dry ice-alcohol bath. 18 grams of liquid chlorine were then added, this being more than sufficient to completely cover the sugar. The charge after being sealed into the reaction tube was brought to a temperature of 50° C. and was maintained at this temperature for a period of one week. As the reaction progressed the glucose was observed to become almost black in color and subsequently to undergo various color changes until, at the termination of the reaction, the product was a light yellow solid. This solid product was found to be a polymer containing 2 chlorine atoms per glucose unit in the polymer molecule. Between 5 and 6 moles of HCl were formed per glucose unit indicating formation of carbonyl groups.

Example 2

18.04 grams of dry glucose in powdered form and 450 grams of liquid chlorine were charged into a glass lined autoclave. By application of heat the charge was brought to a temperature of 70° C. and was maintained at that temperature for 12 hours. The reaction was then terminated by cooling the autoclave and its contents to room temperature and eliminating the unreacted chlorine and the HCl. The product, which was a solid, yellowish-brown in color and somewhat heterogeneous in appearance, was discharged from the autoclave and was further degassed by application of vacuum. During the chlorination reaction, 5.786 moles of hydrogen chloride were evolved per mole of glucose. The product contained 31.78% chlorine by weight, corresponding to 2.29 moles of chlorine per glucose unit. Pyrolysis of this product for 12 hours in anhydrous acetic acid, under reflux, yielded a solid product which contained 24.33% chlorine, corresponding to 1.82 moles of stable chloride per mole of glucose.

Example 3

The process of Example 2 was repeated with the exception that the glucose was employed in the form of a 25% aqueous solution rather than in the anhydrous condition. In this instance the reaction product was present, together with dissolved HCl and a certain amount of chlorine, in the aqueous layer and was found to consist of a number of compounds of a relatively high degree of oxidation. Although the exact chemical structure of all of the compounds present were not definitely determined they consisted largely of carboxylic acids containing chemically bound chlorine. A non-chlorine containing acid present was oxalic acid.

In the following table are summarized conditions and data of a number of runs pertaining to the chlorination of various sugars in accordance with my process. In each instance the reaction was conducted in a glass lined autoclave. The amount of sugar charged varied from 12 to 20 grams; the chlorine from 450 to 600 grams. The column headed Ratio HCl/Cl refers to the number of mols of HCl evolved per mol of Cl entering into chemical combination with the sugar.

| Sugar Ident. | React. Time (hrs.) | React. Temp., °C. | Ratio HCl/Cl | Product, Percent Cl |
|---|---|---|---|---|
| Glucose | 12 | 50 | 1.56 | 31.03 |
| Do | 12 | 50 | 3.22 | 28.63 |
| Do | 12 | 70 | 2.53 | 31.78 |
| Do | 12 | | | 24.33 |
| Do.ᵃ | 12 | 70 | | 33.31 |
| Do | 18 | 40 | | |
| Do | 8 | 55 | 2.75 | 3.73 |
| Do.ᵇ | 8 | 70 | | |
| Do.ᶜ | 8 | 70 | | |
| Do | 6 | 100 | 2.98 | 50.67 |
| Do | 6 | 100 | 2.73 | 51.64 |
| Do | 24 | 100 | 2.88 | 53.89 |
| Glucose.H₂O | 6 | 100 | 3.21 | 52.08 |
| Xylose | 12 | 70 | 2.19 | 38.88 |
| Sucrose | 12 | 70 | 2.31 | 33.93 |
| Fructose | 8 | 65 | 1.23 | 40.53 |
| Glucose.H₂O | 12 | 70 | 1.70 | 13.28 |
| Maltose | 12 | 70 | | 26.59 |

ᵃ 0.6 moles of HCl was introduced.
ᵇ,ᶜ Reaction conducted under aqueous conditions giving product which was for the most part oxidized. The oxidized products consisted largely of oxalic and other carboxylic acids.

From the foregoing it will be seen that my process provides a means whereby useful derivatives may be obtained by interaction of relatively abundant and inexpensive raw materials, and, therefore, is of outstanding potential industrial value.

It will be understood that the above particular description is by way of illustration, and that changes, omissions, additions, substitutions and/or modifications may be made by persons skilled in the art, without departing from the spirit of the invention, which is intended to be limited only by the scope of the claims.

I claim:
1. A process for the chlorination of sugars, comprising maintaining a sugar immersed in liquid chlorine under substantially anhydrous conditions and under superatmospheric pressure until chemical reaction occurs.

2. A process for the chlorination of sugars, comprising maintaining a sugar immersed in liquid chlorine under substantially anhydrous conditions and under superatmospheric pressure until the chemically combined chlorine content of the product reaches at least an average of one chlorine atom per sugar ring.

3. A process for the chlorination of sugars, comprising maintaining a sugar immersed in liquid chlorine under substantially anhydrous conditions and under superatmospheric pressure until the chemically combined chlorine content of the product reaches an average value of from one chlorine atom per sugar ring to six chlorine atoms per sugar ring.

4. A process for the chlorination of sugars, comprising maintaining a sugar immersed in liquid chlorine under substantially anhydrous conditions and under superatmospheric pressure until chemical reaction occurs resulting in evolution of hydrogen chloride, and maintaining in the zone of the reaction a molecular ratio of chlorine to hydrogen chloride of at least about 6:1 when the amount of chemically combined chlorine in the product is less than an average of one chlorine atom per sugar ring.

5. The proces of claim 1 in which the sugar is glucose.

6. The process of claim 2 in which the sugar is glucose.

7. A process for the chlorination of sugars, comprising maintaining a sugar immersed in liquid chlorine under substantially anhydrous conditions and at a temperature between 40° and 140° C. until chemical combination between the sugar and chlorine has occurred, resulting in evolution of hydrogen chloride, and maintaining in the zone of the reaction a molecular ratio of chlorine to hydrogen chloride of at least about 6:1 when the amount of chemically combined chlorine in the sugar is less than an average of one chlorine atom per sugar ring.

8. The process of claim 7 in which the sugar is glucose.

9. A process for the chlorination of glucose, comprising maintaining the glucose immersed in liquid chlorine under substantially anhydrous conditions and at a temperature between 60° and 100° C. until chemical combination between the glucose and chlorine has occurred, resulting in evolution of hydrogen chloride, and maintaining in the zone of the reaction a molecular ratio of chlorine to hydrogen chloride of at least about 6:1 when the amount of combined chlorine in the glucose is less than about 17% by weight.

10. A process for the concurrent chlorination and polymerization of sugars comprising maintaining a sugar immersed in liquid chlorine under substantially anhydrous conditions and under super-atmospheric pressure at a temperature between about 40° C. and 100° C. until the chlorine content of the product exceeds at least one chlorine atom per sugar ring initially introduced.

11. A process for the production of chlorinated sugar products substantially free of chlorocarbinol groups comprising maintaining a sugar immersed in liquid chlorine under substantially anhydrous conditions and under superatmospheric pressure until chemical reaction occurs, resulting in evolution of hydrogen chloride, and maintaining in the zone of the reaction a molecular ratio of chlorine to hydrogen chloride of at least about 6:1 when the amount of combined chlorine in the sugar is less than an average of one chlorine atom per sugar ring, and thereafter subjecting the product to mild pyrolysis under sub-atmospheric pressure whereby loosely combined chlorine is eliminated as hydrochloric acid.

12. The product prepared in accordance with the process of claim 1.

13. Chlorinated glucose containing from 17% to 60% by weight of chemically bound chlorine resulting from reaction of glucose with liquid chlorine under substantially anhydrous conditions.

14. Glucose chlorides in polymeric form containing an average of from one to six chemically bound chlorine atoms per glucose unit, said chlorinated polymer consisting of at least 2 glucose units joined through ether linkages and resulting from reaction of glucose with liquid chlorine under substantially anhydrous conditions.

15. A process for the production of chlorinated sugars having a chlorine content from one to six chlorine atoms per sugar ring which comprises immersing a sugar in liquid chlorine under substantially anhydrous conditions under superatmospheric pressure and removing the chlorinated sugar from said liquid chlorine when said chlorine content has been reached.

16. A process for chlorinating and polymerizing glucose comprising heating glucose immersed in liquid chlorine under substantially anhydrous conditions at a temperature of about 50° C. for about one week.

References Cited in the file of this patent

UNITED STATES PATENTS

| Number | Name | Date |
|---|---|---|
| 2,448,510 | Barham | Sept. 7, 1948 |
| 2,562,884 | Barham | Aug. 7, 1951 |

OTHER REFERENCES

Ann. der Chemie, Hlasiwetz, 119 (1861), pp. 281–2, 2 pages.

Hlasiwetz et al., 155 (1870), pp. 122, 123, 128–133, 8 pages.